(12) United States Patent
Parker, III

(10) Patent No.: US 9,346,438 B1
(45) Date of Patent: May 24, 2016

(54) WHEEL SWEEPER SYSTEMS

(71) Applicant: Harold Emery Parker, III, Irving, NY (US)

(72) Inventor: Harold Emery Parker, III, Irving, NY (US)

(*) Notice: Subject to any disclaimer, the term of this patent is extended or adjusted under 35 U.S.C. 154(b) by 0 days.

(21) Appl. No.: 14/728,811

(22) Filed: Jun. 2, 2015

Related U.S. Application Data

(60) Provisional application No. 62/006,358, filed on Jun. 2, 2014.

(51) Int. Cl.
*B60S 1/68* (2006.01)
*B08B 1/00* (2006.01)

(52) U.S. Cl.
CPC .. *B60S 1/68* (2013.01); *B08B 1/002* (2013.01)

(58) Field of Classification Search
CPC ............. B60S 1/68; B60S 1/685; A61G 5/10; B08B 1/002
USPC ................... 280/855, 856, 158.1; 15/256.5
See application file for complete search history.

(56) References Cited

U.S. PATENT DOCUMENTS

| | | | | |
|---|---|---|---|---|
| 794,239 | A * | 7/1905 | Maguire | B62D 25/186 280/157 |
| 3,231,293 | A * | 1/1966 | Loustaunau | A61G 5/10 15/160 |
| 4,605,239 | A | 8/1986 | Warfel | |
| 5,188,394 | A * | 2/1993 | Roche | B60S 1/68 172/606 |
| 5,430,906 | A * | 7/1995 | Drury | B62D 25/182 15/160 |
| 5,857,238 | A * | 1/1999 | Jmill | B60S 1/68 15/244.1 |
| 6,434,781 | B1 * | 8/2002 | Guerra | B60S 1/685 15/160 |
| 6,776,698 | B2 | 8/2004 | Pepin | |
| 9,067,570 | B2 * | 6/2015 | Kueppers | B60S 1/685 |
| 2014/0284911 | A1 | 9/2014 | Kueppers | |

* cited by examiner

*Primary Examiner* — John Walters
*Assistant Examiner* — Brian Swenson
(74) *Attorney, Agent, or Firm* — RG Patent Consulting, LLC; Rachel Gilboy

(57) ABSTRACT

A wheel sweeper system is a brush mounted to a bracket that clamps to the frame of a wheeled device such as a wheel chair to continually sweep dirt and mud off of the wheel ground contact surfaces as the wheel rotates to greatly reduce tracking the debris onto building floors.

12 Claims, 5 Drawing Sheets

WHEEL SWEEPER SYSTEMS

CROSS-REFERENCE TO RELATED APPLICATION

The present application is related to and claims priority from prior provisional application Ser. No. 62/006,358, filed Jun. 2, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of wheel cleaners and more specifically relates to a wheel sweeper system.

2. Description of the Related Art

One aspect of any type of flooring is that it is not self cleaning. A great deal of labor generally goes into cleaning every occupied residential or in-use commercial building annually. The condition and the frequency that the floors get dirty usually dictate how often the floors get cleaned. In climates that have high rainfall measurements annually or that have particular types of soils, the cleaning of floors can get tiring not to mention expensive when using hired labor. Devices such as foot cleaning mats or brushes are sometimes found near doorways so people can clean mud off of their feet before entering a residence or commercial building, but in homes having handicap individuals that use wheel chairs, or in commercial buildings that wheeled carts such as grocery baskets frequently enter and exit, no provision is made. The wheels on carts or wheel chairs in these regions can be the major source of tracked soil and debris into buildings since cleaning the wheels is not nearly as convenient as it is for a person to clean his or her feet on a mat or shoe cleaning brush before entering. The wheels of these devices can track mud, dirt, rocks, stickers, or other debris into buildings rapidly when the traffic is high. A device that allows the continuous and reliable cleaning of wheels would be very welcomed.

Various attempts have been made to solve the above-mentioned problems such as those found in U.S. Pat. No. 4,605, 239 to Jeff Warfel, U.S. Pat. No. 6,776,698 to Daniel Pepin; and 2014/0284911 to Jeffrey Kueppers. This art is representative of automatic wheel cleaning brushes. None of the above inventions and patents, taken either singly or in combination, is seen to describe the invention as claimed.

Ideally, a wheel cleaner should provide reliability and ease of use, and yet, would operate reliably and be manufactured at a modest expense. Thus, a need exists for a reliable wheel sweeper system to avoid the above-mentioned problems.

BRIEF SUMMARY OF THE INVENTION

In view of the foregoing disadvantages inherent in the known wheel cleaner art, the present invention provides a novel wheel sweeper system. The general purpose of the present invention, which will be described subsequently in greater detail, is to provide reliability and ease of use.

The wheel sweeper system is a device that is designed to be attached to most any wheeled apparatus to continuously clean the wheel as it rotates. The device is specifically designed to be attached to wheel chairs, shopping carts, push carts, moving dollies, or any similar apparatus that moves indoors and outdoors frequently. The wheel sweeper system preferably comprises a wheel brush assembly having a frame clamp with an adjustment side and a bracket mount side, and a brush bracket having a first end, a second end, and a wheel brush. A wheel brush assembly is used for each wheel of the wheeled apparatus.

The frame clamp of the wheel brush assembly is typically mountable to the support frame of the wheeled apparatus adjacent to one of the wheels and adjusted so that the wheel brush is positioned around a portion of the back of the wheel so that the bristles of the wheel brush contact the ground contact surface of the wheel to wipe off dirt, mud, or debris to keep indoor floors clean. The frame clamp preferably comprises a circular inner periphery structured for clamping onto a cylindrical frame part of the wheeled apparatus, but may also have an oval, square, hexagonal, rectangular, or any such polygonal inner periphery to match nearly any frame type cross-section. The wheel brush assembly is particularly useful for use on the wheels of wheel chairs but is also useful on carts that may be rolled indoors and outdoors to minimize the frequency of cleaning floors. The frame clamp may comprise a split ring to facilitate easy mounting of the frame clamp onto the support frame. The adjustment side of the frame clamp may have a size adjustment fastener for adjusting the inner circumference of the frame clamp to rigidly grip the outer circumference of the support frame. The clamp tightening means may be a wing-nut and a threaded fastener for adjusting the diameter of the inner circumference of the split ring.

A typical front wheel of a walker swivels around an axial attachment pin, wherein the brush is attached to the wheel via this pin such that when the wheel swivels the brush will still be in proper orientation to clean the wheel when the wheel is rotating.

The brush configuration for the back wheel of a typical walker can be connected to the frame of the walker via a wire that is attached on one end to the frame, is threaded through its pipe clamp, and then is shaped to hold the brush on the bottom end thereof and in proper position to clean the back wheel when rotating.

The bracket mount side of the frame clamp couples to the first end of the brush bracket. The bracket mount side of the frame clamp may comprise hooked bars for gripping the first end of the brush bracket. The first end of the brush bracket preferably has a slot on each side such that the hooked bars of the bracket mount side of the frame clamp are able to couple to the first end of the brush bracket to prevent vertical or horizontal movement of the wheel brush assembly when mounted. The brush bracket itself may resemble an E-shape when viewed from the top side. As viewed from the top side, the first end and the second end of the brush bracket are perpendicular to the center portion of the brush bracket. A center-piece is parallel planar to the first end and the second ends and located between the first and the second ends. The center-piece is integral with the center portion, the first end, and the second end of the brush bracket. The second end and the center-piece together with the center portion form a u-shape for nestably enveloping a portion of a back side of the wheel without contacting the outer surface of the wheel with any metal parts, other than with the wheel brush.

The wheel brush is non-removably attached to the center portion of the brush-bracket within the u-shape formed by the second end and the center-piece with the bristles deposed perpendicularly to the center portion on the inner facing side of the brush bracket. The bracket mount side of the frame clamp may comprise a biasing clamp for gripping the first end of the brush bracket in one embodiment and in another embodiment the halves of the split ring may hook together within the slot in the first end of the brush bracket to form a hinge while simultaneously gripping the brush bracket rigidly. The wheel brush may comprise a plurality of bristles structured and arranged to continuously remove loosely attached dirt and debris from the ground contact portion of the wheel while the wheel is rotating. In other embodiments, the wheel brush may be a flexible flap that contacts the wheel. The wheel brush assembly is stationary in an in-use condition since it is attached to the frame of the wheeled apparatus but may be attached to the center axis rod of the wheel when used with caster wheels so that it swivels with the wheel.

The main function of the wheel brush assembly is to continuously clean the wheels of a wheeled apparatus while the wheels are rotating to minimize the wheels carrying dirt and debris into a building and depositing the dirt, mud, or debris onto a floor of the building so that the expense and labor of cleaning the floors is greatly reduced, however, other benefits may also be realized such as extending the life of the wheels by preventing rocks or other objects from sticking to the wheel that can cut and prematurely wear the wheel surface.

The wheel sweeper system may have a kit that includes at least one the wheel brush assembly having at least one frame clamp, at least one brush bracket, at least one wheel brush, and at least one set of user mounting instructions.

A method of installation for a wheel sweeper system may comprise the steps of loosening the wing-nut on the threaded fastener to open the frame clamp of the wheel brush assembly, placing the frame clamp around the support frame of the wheeled apparatus adjacent to the wheel to be continuously cleaned when the wheel is rotating, adjusting the proximity of the wheel brush of the wheel brush assembly in relation to the wheel such that the wheel brush contacts the ground contact surface portion of the wheel, and tightening the wing-nut on the threaded fastener of the frame clamp to tighten the frame clamp onto the support frame of the wheeled apparatus.

The present invention holds significant improvements and serves as a wheel sweeper system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, wheel sweeper system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a wheel cleaner and more particularly to a wheel sweeper system as used to reduce the tracking of dirt and mud into a commercial or residential building.

Generally speaking, a wheel sweeper system is a brush mounted to a bracket that clamps to the frame of a wheeled device such as a wheel chair to continually sweep dirt and mud off of the wheel ground contact surfaces as the wheel rotates to greatly reduce tracking the debris onto building floors.

Figure 1:
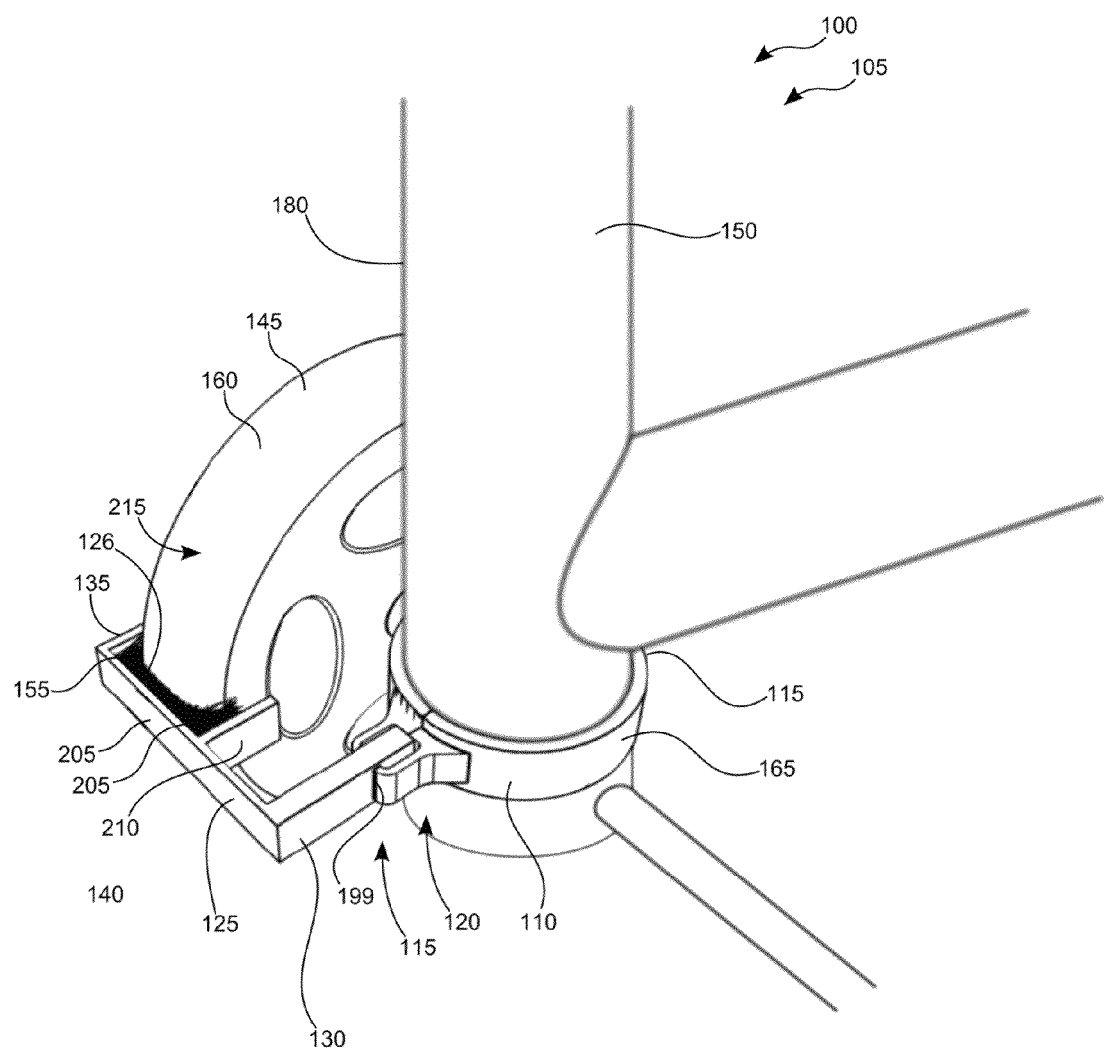
FIG. 1 shows a perspective view illustrating an in-use condition of a wheel sweeper system according to an embodiment of the present invention.

In greater detail now, referring to the drawings by numerals of reference, there is shown in FIG. 1, a perspective view illustrating an in-use condition of wheel sweeper systems 100 according to an embodiment of the present invention.

Wheel sweeper systems 100 is a device that is designed to be attached to most any wheeled apparatus to continuously clean wheels 145 as they rotate. The device is specifically designed to be attached to wheel chairs, shopping carts, push carts, moving dollies, or any similar apparatus that moves indoors and outdoors frequently. Frame clamp 110 of wheel brush assembly 105 is typically mountable to support frame 150 of a wheeled apparatus adjacent to wheel(s) 145 and adjusted so that wheel brush 140 is positioned around a portion of the back of wheel(s) 145 so that bristles 155 of wheel brush 140 contact ground contact surface 160 of wheel(s) 145 to wipe off dirt, mud, or debris to keep the indoor floors clean. Wheel brush assembly 105 is particularly useful for use on wheel(s) 145 of wheel chairs but is also useful on carts that may be rolled indoors and outdoors to minimize the frequency of cleaning the floors. The main function of wheel brush assembly 105 is to continuously clean wheel(s) 145 of a wheeled apparatus while wheel(s) 145 are rotating to minimize wheel(s) 145 from carrying dirt and debris into a building and depositing dirt, mud, or debris onto the floor of the building so that the expense and labor of cleaning the floors is greatly reduced, however, other benefits may also be realized such as extending the life of wheel(s) 145 by preventing rocks or other objects from sticking to wheel(s) 145 that can cut and prematurely wear ground contact surface 160 of wheel(s) 145.

Figure 2:
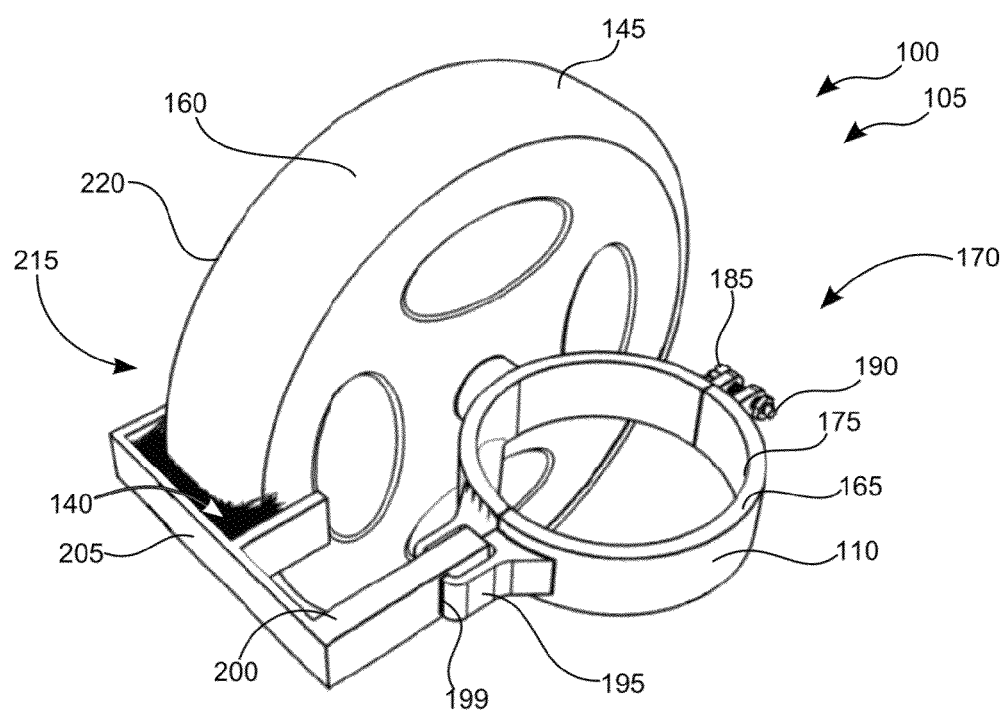
FIG. 2 is a perspective view illustrating a wheel sweeper assembly of the wheel sweeper system according to an embodiment of the present invention of FIG. 1.

Referring now to FIG. 2, a perspective view illustrating wheel brush assembly 105 of wheel sweeper systems 100 according to an embodiment of the present invention of FIG. 1.

Wheel sweeper systems 100 preferably comprises wheel brush assembly 105 having frame clamp 110 with adjustment side 115 and bracket mount side 120, and brush bracket 125 having first end 130, second end 135, and wheel brush 140. Wheel brush assembly 105 is used for each wheel(s) 145 of a wheeled apparatus. Frame clamp 110 may comprise split ring 165 to facilitate easy mounting of frame clamp 110 onto support frame 150. Adjustment side 115 of frame clamp 110 may have size adjustment fastener 170 for adjusting inner circumference 175 of frame clamp 110 to rigidly grip outer circumference 180 of support frame 150. The clamp tightening means may be wing-nut 185 and threaded fastener 190 for adjusting the diameter of inner circumference of frame clamp 110. Bracket mount side 120 of frame clamp 110 couples to first end 130 of wheel brush 140. Bracket mount side 120 of frame clamp 110 may comprise hooked bars 195 for gripping first end 130 of brush bracket 125. Bracket mount side 120 of frame clamp 110 may comprise a biasing clamp for gripping first end 130 of brush bracket 125 in one embodiment and in another embodiment halves of split ring 165 may hook together within slot 199 in first end 130 of brush bracket 125 to form a hinge while simultaneously gripping brush bracket 125 rigidly.

Figure 3:
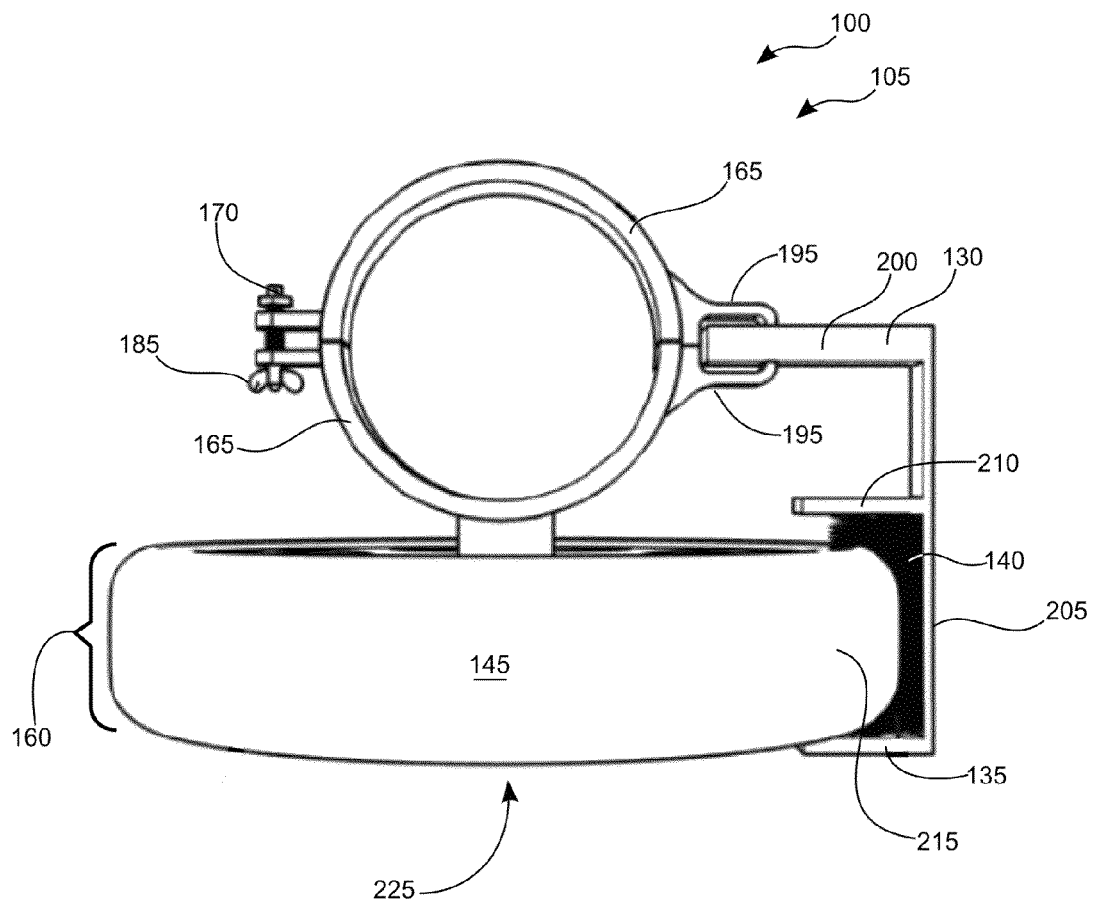
FIG. 3 is an overhead view illustrating wheel sweeper system according to an embodiment of the present invention of FIG. 1.

Referring now to FIG. 3, an overhead view illustrating wheel sweeper systems 100 according to an embodiment of the present invention of FIG. 1.

Frame clamp 110 preferably comprises a circular inner periphery structured for clamping onto a cylindrical support frame 150 of a wheeled apparatus, but may also have an oval, square, hexagonal, rectangular, or any such polygonal inner periphery to match nearly any support frame 150 type cross-section. First end 130 of brush bracket 125 preferably has slot 199 on each side such that hooked bars 195 of bracket mount side 120 of frame clamp 110 are able to couple to first end 130 of brush bracket 125 to prevent vertical or horizontal movement of wheel brush assembly 105 when mounted. Brush bracket 125 itself may resemble an E-shape when viewed from top side 200. As viewed from top side 200, first end 130 and second end 135 of brush bracket 125 are perpendicular to center portion 205 of brush bracket 125. Center-piece 210 is parallel planar to first end 130 and second end 135 and located between first 130 and second ends 135. Center-piece 210 is integral with center portion 205, first end 130, and second end 135 of brush bracket 125. Second end 135 and center-piece 210 together with center portion 205 form a u-shape for nestably enveloping a portion of a back side 215 of wheel(s) 145 without contacting outer surface 220 of wheel(s) 145 with any metal parts, other than with wheel brush 140. Wheel brush 140 is non-removably attached to center portion 205 of brush bracket 125 within u-shape formed by second end 135 and center-piece 210 with bristles 155 deposed perpendicularly to center portion 205 on inner facing side 126 of brush bracket 125.

Figure 4:
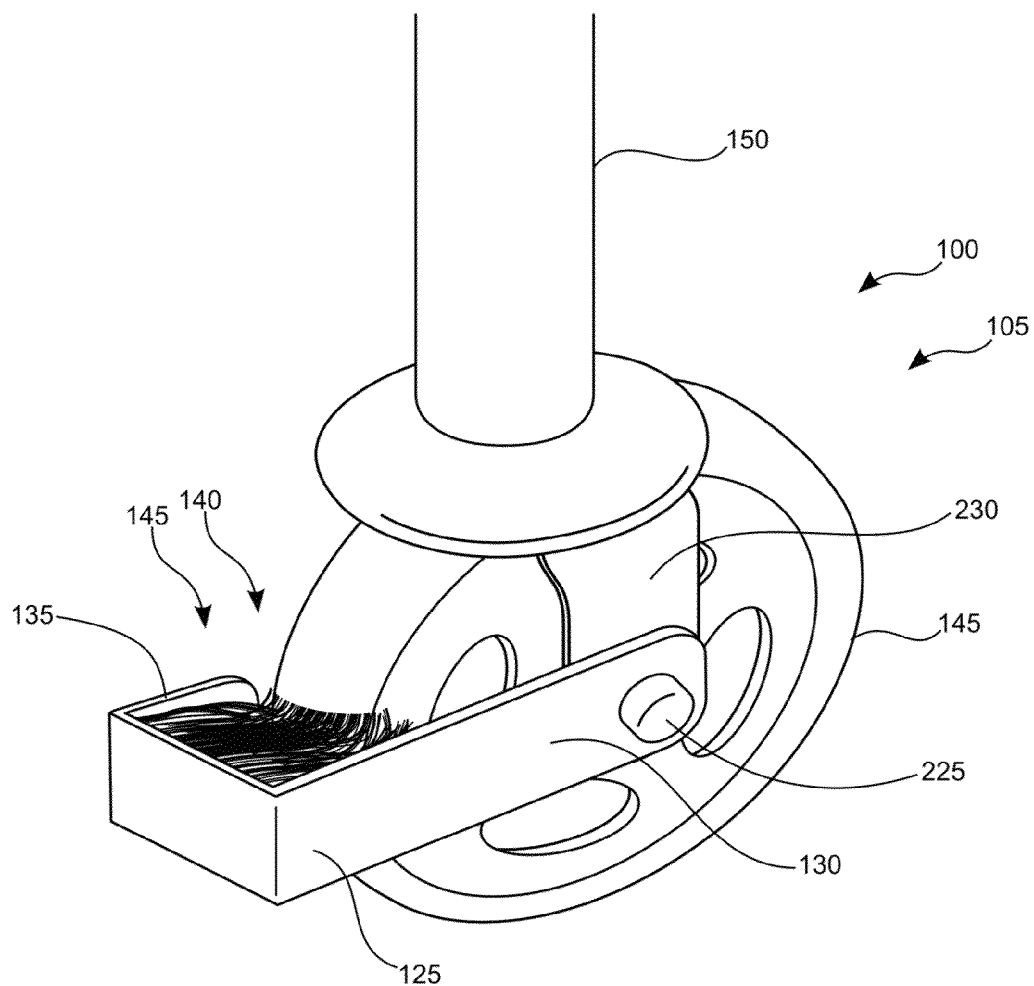
FIG. 4 is a perspective view illustrating an alternate embodiment of the wheel sweeper system mounted to a swivel caster according to an embodiment of the present invention of FIG. 1.

Referring now to FIG. 4, is a perspective view illustrating an alternate embodiment of wheel sweeper systems 100 mounted to a swivel caster according to an embodiment of the present invention of FIG. 1.

Wheel brush 140 may comprise a plurality of bristles 155 that are structured and arranged to continuously remove loosely attached dirt and debris from ground contact surface 160 of wheel(s) 145 while wheel(s) 145 is/are rotating. In other embodiments, wheel brush 140 may be a flexible flap that contacts wheel(s) 145. The particular material used for wheel brush 140 is not of the essence of this invention and as such is not limited to one particular material but rather to any suitable material that may be used for contact with wheel(s) 145. The material may change based on availability, cost, technology advances, or manufacturing requirements. Wheel brush 140 assembly is stationary in an in-use condition since it is attached to support frame 150 of the wheeled apparatus but in an alternate embodiment, may be attached to center axis rod 225 of wheel(s) 145 when used with caster wheels 230 or other similar horizontally pivotal wheel(s) 145 so that wheel brush 140 assembly swivels or horizontally rotates with wheel(s) 145.

Wheel sweeper system 100 may be sold as kit 450 comprising the following parts: at least one wheel brush assembly 105 having at least one frame clamp 110; at least one brush bracket 125; at least one wheel brush 140; and at least one set of user instructions. The kit has instructions such that functional relationships are detailed in relation to the structure of the invention (such that the invention can be used, maintained, or the like in a preferred manner). Wheel sweeper system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
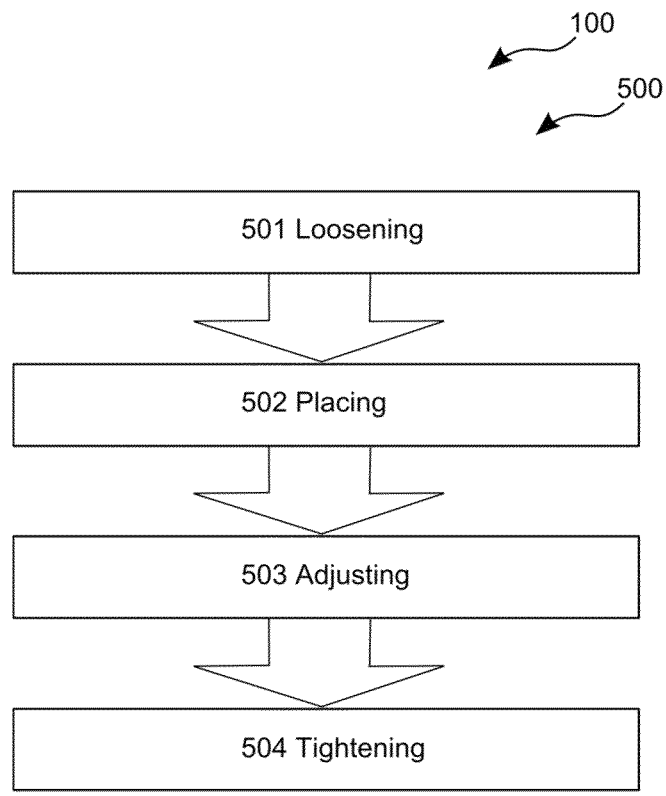
FIG. 5 is a flowchart illustrating a method of use for the wheel sweeper system according to an embodiment of the present invention of FIGS. 1-4.

Referring now to FIG. 5, showing method of installation 500 for wheel sweeper systems 100. A method of using wheel sweeper systems 100 may comprise the steps of step one 501 loosening wing-nut 185 on threaded fastener 190 to open frame clamp 110 of wheel brush assembly 105; step two 502 placing frame clamp 110 around support frame 150 of the wheeled apparatus adjacent to wheel(s) 145 to be continuously cleaned when wheel(s) 145 is rotating; step three 503 adjusting the proximity of wheel brush 140 of wheel brush assembly 105 in relation to wheel(s) 145 such that wheel brush 140 contacts ground contact surface 160 portion of wheel(s) 145; and step four 504 tightening wing-nut 185 on threaded fastener 190 of frame clamp 110 to tighten frame clamp 110 onto support frame 150 of the wheeled apparatus.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A wheel sweeper system comprising:
    a frame clamp having;
        an adjustment side; and
        a bracket mount side;
    a brush bracket having;
        a first end;
        a second end; and
    a wheel brush assembly;
    wherein said wheel brush assembly is adapted to continuously clean a rotating wheel;
    wherein said frame clamp of said wheel brush assembly is adapted to be mounted to a support frame of a wheeled apparatus adjacent to a wheel of said wheeled apparatus;
    wherein said adjustment side of said frame clamp includes an adjustable fastener for adjusting a gripping surface of said frame clamp adapted to rigidly grip an outer circumference of said support frame;
    wherein said bracket mount side of said frame clamp couples to said first end of said brush bracket;
    wherein said wheel brush is connected to a side of said brush bracket; and
    wherein said wheel sweeper system is adapted to attach to said wheeled apparatus to continuously clean said wheel while said wheel is rotating to thereby minimize dirt and debris from being carried into a building and deposited onto a floor of said building;
    wherein said brush bracket is formed as having an E-shape;
    wherein said brush bracket further includes a center piece integral with and supporting said first end and said second end; and
    wherein said first end and said second end of said brush bracket are perpendicular to a center portion of said brush bracket and said center piece is parallel to said first end and said second end.

2. The wheel sweeper system of claim 1 wherein said gripping surface of said frame clamp includes a circular inner periphery adapted for clamping onto a cylindrical frame part of said wheeled apparatus.

3. The wheel sweeper system of claim 2 wherein said frame clamp is formed as a split ring, and wherein said adjustment side of said frame clamp includes a wing-nut and a threaded fastener for adjusting a diameter of said inner circular periphery of said split ring.

4. The wheel sweeper system of claim 1 wherein said frame clamp is formed as a split ring and is adapted to facilitate mounting said frame clamp onto said support frame.

5. The wheel sweeper system of claim 1 wherein said second end and said center piece together with said center portion form a U-shape.

6. The wheel sweeper system of claim 5 wherein said U-shape formed by said second end, said center piece, and said center portion is adapted to surround a portion of a back side of said wheel.

7. The wheel sweeper system of claim 6 wherein said wheel brush is attached to said center portion of said brush bracket within said U-shape.

8. The wheel sweeper system of claim 7 wherein said wheel brush comprises a plurality of bristles structured and arranged to continuously remove dirt and a debris from a ground contact portion of said wheel while said wheel is rotating.

9. The wheel sweeper system of claim 8 wherein said wheel brush assembly is stationary in an in-use condition.

10. The wheel sweeper system of claim 9 wherein said wheel brush assembly is adapted to be mounted to a center axis shaft of a caster wheel.

11. The wheel sweeper system of claim 1 wherein said bracket mount side of said frame clamp includes hooked bars for gripping said first end of said brush bracket.

12. The wheel sweeper system of claim 11 wherein said first end of said brush bracket includes a slot on each side such that said hooked bars are adapted to grip and therein prevent vertical and a horizontal movement of said wheel brush.

* * * * *